United States Patent Office 3,285,891
Patented Nov. 15, 1966

3,285,891
HALOGEN-FREE POLYMERIZATION CATALYSTS
Victor D. Aftandilian, Watertown, Mass., assignor to Cabot Corporation, Boston, Mass., a corporation of Delaware
No Drawing. Filed Jan. 9, 1964, Ser. No. 336,631
20 Claims. (Cl. 260—85.3)

This invention relates to the polymerization and copolymerization of mono- and/or di-olefins such as ethylene, propylene, butene-1, styrene, isoprene and butadiene and includes within its scope novel catalysts for such polymerization reactions.

It has been disclosed in U.S. application Serial No. 323,238, filed Nov. 13, 1963, by Adam Orzechowski and James C. MacKenzie, that mono- and di-olefins are polymerized or copolymerized by catalysts comprising (a) the product of the reaction carried out under certain conditions between certain esters of Group IVa, Va or VIa metals and hydroxyl groups on the surface of a nonporous, finely-divided inorganic solid, and (b) an organometallic compound. More recently, it has been discovered that the efficiency (i.e. as measured by grams of polymer producible per gram of utilized catalyst) of catalysts of the type disclosed in said aforementioned application can be vastly improved.

Accordingly, it is a principal object of the present invention to provide improved catalyst compositions.

It is another object of the present invention to provide an improved process for polymerizing mono- and/or di-olefins.

Other objects of the present invention will in part be obvious and will in part appear hereinafter.

In accordance with the present invention, it has been discovered that the efficiency of catalysts comprising the product of reaction between certain esters of Group IVa, Va or VIa metals and hydroxyl groups on the surface of finely-divided inorganic solids is vastly increased by the addition thereto of a Lewis acid. The polymerization or copolymerization reaction can be effected at suitable temperatures within the range from below atmospheric upwardly to any desired maximum pressure, for example, 30,000 p.s.i.g. or even higher pressures.

Inorganic solids suitable for the purposes of the present invention generally include any finely-divided solid having an average particle diameter of less than about 0.1 micron and having at least about $5 \times 10^{-4}$ equivalents per gram of hydroxyl groups on the surface thereof, and which, excepting the hydroxyl groups, is substantially inert to said ester compounds. For example, extremely finely-divided metal oxides such as titania, zirconia, thoria, magnesia and silica, and carbon blacks such as channel black are all generally suitable.

It should be noted that, generally speaking, the ultimate activity and efficiency of the catalyst components produced according to the present invention are largely dependent upon the accomplishment of an actual chemical reaction of controlled extent between the hydroxyl groups on the surface of the finely-divided solids and said metal esters. Further, it should be borne in mind that, all other factors being equal, the smaller the average particle size of the solid and the larger the quantity of hydroxy groups on the exterior surface thereof, the greater will be the potential activity and efficiency of the resulting catalyst component producible therefrom. Therefore, it is important to use as the starting material substantially nonporous finely-divided solids having an average particle diameter of less than about 0.1 micron, and preferably less than about 0.05 micron, and a hydroxyl group content on the surface thereof of at least about $5 \times 10^{-4}$ equivalents per gram. Accordingly, pyrogenic metal or metalloid oxides produced by the vapor phase oxidation or hydrolysis of a corresponding metal or metalloid compound are greatly preferred because they are generally nonporous and are available in average particle diameters of less than about 0.1 micron.

Transition metal esters suitable for the purposes of the present invention generally include those compounds conforming to the formula $$TO_zQ_s$$

where T is a metal chosen from the group consisting of Groups IVa, Va and VIa (where the group numbers correspond to the Mendeleev Periodic System); O is oxygen; z is a number from 0 to 1; each Q is chosen from the group consisting of alkoxy and aryloxy radicals having 1 to 8 carbon atoms and s is a number from 1 to 6.

Specific examples of Q groups for substitution in the above formula include methoxy ($CH_3O$—); butoxy ($C_4H_9O$—); isopropoxy (i-$C_3H_7O$—); allyloxy $$(C_3H_5O\text{—})$$

s-amyloxy (s-$C_5H_{11}O$—); cyclopentyloxy ($C_5H_9O$—); tolyloxy ($CH_3C_6H_4O$—); hexyloxy ($C_6H_{13}O$—); ethyloxy ($C_2H_5O$—); and the like.

Specific examples of compounds conforming to the formula $$T(Q)_s$$

which are suitable for the purposes of the present invention are:

tetra-i-propoxy titanium—(i-$C_3H_7O$)$_4$Ti;
methoxy-i-propoxy dibutoxy titanium—
  (i-$CH_3H_7O$)$CH_3OTi(OC_4H_9)_2$;
tripopoxy butoxy titanium—($C_3H_7O$)$_3$Ti$OC_4H_9$;
tetra-t-butoxy titanium—(t-$C_4H_9O$)$_4$Ti;
tetracyclopentyloxy titanium—($C_5H_9O$)$_4$Ti;
tetradiethyl-1-ethoxy zirconium—[$CH_3(C_2H_5)_2CO$]$_4$Zr;
tetrabutoxy zirconium—($C_4H_9O$)$_4$Zr;
tetramethoxy vanadium—($CH_3O$)$_4$V;
tetrabutoxy chromium—($C_4H_9O$)$_4$Cr;
hexamyloxy tungsten—($C_5H_{11}O$)$_6$W;
triethyl vanadate—($C_2H_5O$)$_3$VO;
tributyl vanadate—($C_4H_9O$)$_3$VO;
and the like.

In addition to transition metal esters strickly conforming to the above formula, esters wherein other groups have been substituted for some of the alkoxy or aryloxy groups can be utilized in accordance with the present invention so long as said other groups do not interfere with the reaction of the remaining alkoxy or arloxy radicals with hydroxyl groups on the surface of the solid.

The conditions under which reaction between the transition metal esters and hydroxyl groups on the surface of the nonporous inorganic solids can be accomplished are subject to considerable variation. However, in order to obtain a catalyst component with a high order of activity and reproducible character and performance, it is normally necessary that the inorganic solid be essentially dry and anhydrous (i.e. free of molecular water in any form) at the time it is brought into contact with the transition metal ester. If the finely-divided solid to be utilized contains molecular water in any form and/or tends to adsorb same on exposure to humid atmospheres, etc., it must be dried immediately before use, or after drying must be maintained continuously out of contact with water vapor until utilized. If the precaution of using a substantially anhydrous finely-divided solid is not observed, the desired chemical reaction either does not occur at all or does not predominate to the extent necessary to produce a superior catalyst component. Instead, products are obtained which are either totally inactive as catalyst components or are very inferior as catalyst components, in that (a) less polymer per gram of catalyst is produced and (b) monomer conversion rates for production of polymer are lower.

Generally, the desired reaction can be carried out by contacting the solid with a transition metal ester, preferably a solution thereof in an inert hydrocarbon medium, and maintaining the two reactants in intimate contact while removing the by-product alcohol for a period of time sufficient to effect the desired chemical reaction resulting in the chemical bonding of the transition metal ester to the finely-divided solid. It is believed, although there is no intent to be bound by this explanation, that the following illustrative equations correctly demonstrate the desired reactions in which silica represents the finely-divided solid and tetrabutoxy titanium represents the transition metal ester:

*Equation 1*

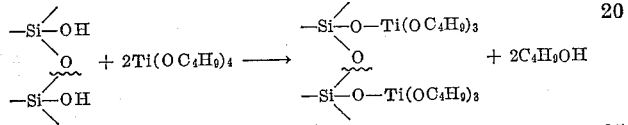

*Equation 2*

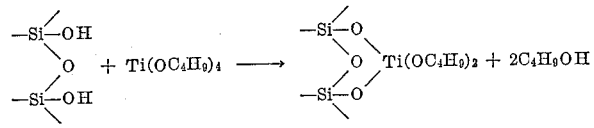

*Equation 3*

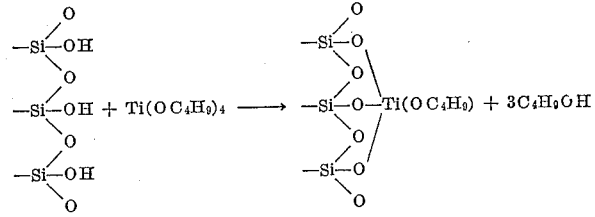

The length of time required to effect a given amount of said reaction is largely deepndent upon the temperature of the reaction mixture and the rate of removal of the by-product alcohol. Generaly speaking, any temperature between about 0° C. and about 300° C., can be used satisfactorily, but room temperature or higher will generaly be used. Assuming provision is made for intimate contact of the dry finely-divided solid and the transition metal ester, and the by-product alcohol is removed from the reaction zone, the minimum time required to accomplish the desired chemical reaction generally varies from periods of the order of 20 minutes at temperatures of about 200° C. or higher, to periods of the order of 4 hours at temperatures of about 10–20° C. Temperatures substantially higher than about 300° C., e.g. 500° C., are completely needless; hence are of little or no interest.

Although use of the transition metal ester in solution form gives excellent results, reaction of said compound with the finely-divided solid can also be effected if the latter is exposed to sufficient quantitites of the vapors of a transition metal ester under conditions of time and temperature similar to those discussed above. Said vapors can be supplied under their own vapor pressures using a partial vacuum if necessary, or with the aid of a dry, inert carrier gas such as nitrogen. This vapor phase treatment can be accomplished in any suitable manner such as by circulating the vapors through the particulate solid in a fixed or moving bed reactor.

Any organometallic compound which is capable of reducing the transition metal on the surface of the surface-reacted solids described heretofore is suitable for use as the other component of the finished polymerization catalyst of the present invention. Particularly siutable are the compounds chosen from the group consisting of (a) compounds conforming to the empirical formula $$MN'_v X_n R_{y-n}$$

wherein M is a metal chosen from Groups I, II and III of the periodic table; M' is a metal of Group I of the periodic table; $v$ is a number from 0 to 1; each X is any halogen; $n$ is a number from 0 to 3; each R is chosen from the group consisting of any monovalent hydrocarbon radical and hydrogen; $y$ is a number from 1 to 4; and wherein $y-n$ equals at least one; and (b) compounds conforming to the empirical formula $$R'_p H_m S O_{\frac{4-(m+p)}{2}}$$

wherein each R' is chosen from the group consisting of any monovalent hydrocarbon radical, alkoxy radical, aryloxy radical, and the halogens; $p$ is a number from 0 to 3; each H is a hydride radical; $m$ is a number from 1 to 4; S is a quadrivalent metal of Group IVb, i.e., silicon, germanium, tin or lead; and O is oxygen.

Specific examples of R' groups for substitution in the above formula include methyl; 2-methyl-2-butenyl; n-dodecyl; 4-cyclohexylethyl; methylnaphthylethyl; 2,2,1-bicycloheptyl; tolyl; xylyl; xenyl; methoxy; isobutoxy; n-octyloxy; phenoxy and 1,2-naphthoxy.

Specific examples of compounds conforming to the formula $$R'_p H_m S O_{\frac{4-(m+p)}{2}}$$

which are suitable for the puroses of the present invention are:

silane—$SiH_4$;
ethylsilane—$H_3SiC_2H_5$;
diethylmonochlorosilane—$HSiCl(C_2H_5)_2$;
dichlorosilane—$H_2SiCl_2$;
methyldiethylsilane—$HSi(C_2H_5)_2CH_3$;
trimethoxysilane—$HSi(OCH_3)_3$;
tribenzylsilane—$HSi(CH_2C_6H_5)_3$;
triphenoxysilane—$HSi(OC_6H_5)_3$;
triphenylgermane—$(C_6H_5)_3GeH$;
tricyclohexylgermane—$(C_6H_{11})_3GeH$;
tribenzylgermane—$(C_6H_5CH_2)_3GeH$;
ethylisoamylgermane—$(C_2H_5)C_5H_{11}GeH_2$;
dibutylstannane—$(C_4H_9)_2SnH_2$;
diisopropylstannane—$(C_3H_7)_2SnH_2$;
tripentylstannane—$(C_5H_{11})_3SnH$;
n-butylgermane—n-$C_4H_9GeH_3$;
triphenylplumbane—$(C_6H_5)_3PbH$;
triethoxystannane—$(C_2H_5O)_3SnH$ and the like;

cyclic alkyl hydrogen silicones such as $(CH_3HSiO)_6$; and the linear alkyl hydrogen silicones such as $$(CH_3)_2HSiOSiH(CH_3)_2$$

Organometallic compounds which conform to the formula $$MN'_v X_n R_{y-n}$$

and which are suitable for the practice of the present invention include compounds conforming to the subgeneric formula $$M(R)_k$$

wheerin M is a Group I, II or III metal, such as sodium, beryllium, boron, aluminum and gallium; wherein $k$ is a number from 1 to 3, depending upon the valency of M; and wherein each R can be hydrogen or any monovalent hydrocarbon radical. Examples of suitable hydrocarbon radicals include aryl or alkaryl radiacls, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula $$MM'_v X_n R_{y-n}$$

and which are therefore suitable for the purposes of the present invention are organometallic compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodium diphenyllithium. Definitely preferred, however, are the aluminum alkyls such as aluminum triisobutyl.

Further specific examples of suitable organometallic compounds conforming to the formula $$MM'_v X_n R_{y-n}$$

can be found in copending U.S. application, Serial No. 278,414, of Orzechowski and MacKenzie, filed May 6, 1963.

It is pointed out that catalysts formed with certain organometallic compounds such as the silanes and germanes require activation by heating, in the case of the silanes normally to temperatures above about 100° C. and preferably above about 130° C. for at least about 1 hour. At higher temperatures, shorter periods of time are required. At substantially lower temperatures, the catalyst is either not formed at all or is of inferior quality.

Although it is appreciated that when R or R' in the above empirical formulae do not comprise at least one hydrocarbon radical, the resulting compounds cannot normally be termed organometallic compounds, compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above-defined general formulae. In addition, it is pointed out that while, strictly speaking, silicon and germanium are not metals, it is intended, and therefore it should be understood, that for the purposes of the present specification and claims, silicon and germanium are metals and the term organometallic includes within its scope, silicon and germanium compounds within the scope of the formula $$R'_p H_m S O_{\frac{4-(m+p)}{2}}$$

Lewis acids are compounds comprising at least one atom which comprises an unfilled valence shell and which is capable of completing said valence shell with an electron pair from another molecule. Generally speaking, the Lewis theory of acids and bases is well known; however, a general treatise concerning said theory can be found when reference is had to Non-Aqueous Solvents, Audrieth and Kleinberg, John Wiley and Sons, Inc., 1953, pages 36–37.

Lewis acids suitable for use in the practice of the present invention are generally those compounds conforming to the definition of Lewis acids as set forth hereinabove and which are chosen from the group consisting of (a) metal halides (b) organometallic halides, and (c) boron halides. Specific examples of suitable Lewis acids are: aluminum trichloride, ethyl aluminum dichloride, boron trifluoride, boron trichloride, zinc chloride, stannic chloride, ferric chloride, and the like. Preferred, however, are boron trifluoride and aluminum trichloride.

The amount of Lewis acid to be added to the catalyst is subject to considerable variation. Generally speaking, the efficiency of the catalyst is increased by the addition of even relatively minor amounts of said Lewis acid, e.g. about 0.05 or even less millimoles per milliatom of transition metal. Addition of more than about 20 millimoles of said Lewis acid per milliatom of transition metal usually produces little or no further increase in efficiency. I have found the use of between about 0.1 and about 10 millimoles of Lewis acid per milliatom of transition metal to be generally preferred.

The benefits of increased catalyst efficiency which accrue in accordance with the present invention can generally be realized when said Lewis acid is added either prior to the reaction of the catalyst components to form the catalyst or subsequently thereto. When the organometallic compound to be utilized in the formation of the catalyst is one chosen from the group conforming to the formula $$R'_p H_m S O_{\frac{4-(m+p)}{2}}$$

it is preferred that the Lewis acid be added prior to or during formation of the catalyst.

Using the catalysts of this invention the polymerization and copolymerization can often be accomplished in the absence of liquids (other than the monomers themselves) solvents, or diluents, for examples, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable.

The proportion of the surface reacted particulate inorganic solid to organometallic compound utilized in preparing the catalyst is not usually a critical feature of the process. I have found from experience that a molar ratio of from about 1 to 10 millimoles of the organometallic compound per milliatom of transition metal chemically combine to the surface of the finely-divided solid is sufficient.

The quantity of catalyst, i.e. comprising both the surface-reacted finely-divided solid and the organometallic compound, to be utilized in the polymerization reaction may vary, but in general, the total quantity of catalyst that need be employed based on the weight of the charging stock is small when nonporous, very fine particle size oxides are utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

*Example 1*

There is charged into a 2000 milliliter reaction vessel 20 grams of "Cab-o-sil," a nonporous pyrogenic silica produced by Cabot Corporation, having an average BET surface area of about 325 m.²/gram and a surface area calculated from the average diameter obtained by electron microscope examination of about 310 m.²/gram, a hydroxyl group concentration of about 1.5 milliequivalents per gram and an average particles diameter of about 10 millimicrons. There is then added to the reaction vessel 1650 milliliters of toluene and the resulting slurry is dried azeotropically by periodic distillation for 20 hours until the remaining slurry comprises a volume of about 1200 milliliters. Next, without exposure to the atmosphere, there is charged to said slurry 20 millimoles of tetraisopropoxy titanium and the resulting mixture is refluxed for about 8 hours while the isopropanol produced is removed by azeotropic distillation of about 200 milliliters of distillate. The extent of the reaction between hydroxyl groups on the surface of the silica and the tetraisopropoxy titanium is determined by measuring the quantity of isopropanol that was produced and by testing the liquid contents of the vessel for the absence therein of tetraisopropoxy titanium and said silica is found to have 20 milliatoms of titanium chemically bound to the surface thereof. There is then transferred to a 1000 milliliter stainless steel stirred autoclave which has been previously flushed with dry nitrogen, 100 milliliters of said slurry containing 2 milliatoms of titanium bound to the surface of 2 grams of silica. Next, 10 millimoles of triisobutylaluminum previously dissolved in about 400 milliliters of anhydrous toluene is charged to said autoclave and the autoclave is then pressurized to 200 p.s.i.g. with ethylene. The contents of the autoclave are then continuously agitated and heated to and maintained at about 80° C. for about 8 hours while the pressure therein is maintained at about 200 p.s.i.g. by the intermittent introduction of additional ethylene. The reaction products are analyzed and it is found that about 80 grams of solid polyethylene has been produced.

*Example 2*

There is transferred to a 1000 milliliter stainless steel stirred autoclave, 100 milliliters of the tetraisopropoxinated silica slurry produced in Example 1, containing about 2 milliatoms of titanium bound to the surface of 2 grams of silica. Next, there is charged to said autoclave about 6 millimoles of aluminum trichloride and 10 millimoles of triisobutylaluminum previously dissolved in about 400 milliliters of anhydrous toluene. Polymerization of ethylene is then accomplished as set forth in Example 1, and it is found that about 340 grams of polyethylene has been produced.

When, under the same conditions, the triisobutylaluminum is charged to the autoclave prior to addition of the aluminum chloride, substantially the same yield of polyethylene is obtained.

*Example 3*

To a 2000 milliliter, three neck, glass reaction vessel there is added 25 grams of "Alon," a pyrogenic, substantially nonporous, alumina produced by Deutsche Gold- und Silber-Scheideanstalt vormals Roessler, which has an average particle diameter of about 10–40 millimicrons, a hydroxyl group content on the surface thereof of about 0.7 milliequivalent per gram and an average surface area as determined by either the BET method or by calculation from the average diameter of about 90 m.²/gram. Said reaction vessel is then placed in a vacuum drying oven heated to a temperature of about 110° C. for about 15 hours. Subsequently, the vessel is sealed without exposing said alumina to the atmosphere and there is charged to said vessel 8 millimoles of tetrabutoxy zirconium and 1200 milliliters of anhydrous toluene. The resulting slurry is then refluxed at the boiling point of toluene with continuous stirring for about 10 hours, while the butanol produced is removed by the azeotropic distillation of 200 milliliters of distillate. Subsequently, the extent of the reaction between the tetrabutoxy zirconium and hydroxyl groups on the surface of the alumina is determined by measuring the quantity of butanol produced and by testing the liquid contents of the vessel for the absence therein of tetrabutoxy zirconium, and the said alumina is found to have 8 milliatoms of zirconium chemically combined on the surface thereof. Next, 250 milliliters of the butanol-free slurry containing about 2 milliatoms of zirconium bound to the surface of about 6.25 grams of alumina is transferred from this reaction vessel to a 500 milliliter reaction bomb which has been previously flushed with dry nitrogen. Next, about 4 millimoles of boron trifluoride and 10 millimoles of triphenylaluminum is charged to said bomb followed by 500 millimoles of 1,3-butadiene and said bomb is sealed, then heated to and maintained at about 25° C. for about 6 hours with continuous agitation. Subsequently, the reaction products are analyzed and it is found that about 16 grams of a 1,3-butadiene polymer has been produced.

When the above polymerization is repeated with the exception that no boron trifluoride is added to the catalyst, the subsequent polymerization of 1,3-butadiene results in a substantially lower yield of polymer than is obtained when boron trifluoride is present in said catalyst.

*Example 4*

To a 4000 milliliter, three neck, glass reaction vessel equipped with a stirrer, a condenser and nitrogen inlet and outlet tubes, there is added 10 grams of "Cab-o-sil" and 2000 milliliters of n-octane. The resulting slurry is then dried azeotropically for about 12 hours until about 300 milliliters of distillate has been removed. Next, there is charged to the vessel 10 millimoles of tetraethoxy vanadium. The resulting slurry is then refluxed at about 125.7° for about 6 hours with continuous stirring while the ethanol produced is continuously removed by the azeotropic distillation of about 200 milliliters of distillate. Subsequently, the extent of the reaction between the tetraethoxy vanadium and the hydroxyl groups on the silica is determined by measuring the quantity of ethanol that was produced and by testing the liquid contents of the vessel for the absence therein of tetraethoxy vanadium, and the said silica is found to have 10 milliatoms of vanadium chemically bound to the surface thereof. 150 milliliters of this slurry containing about 1 milliatom of vanadium bound to the surface of about 1 gram of silica is then transferred, without exposure to the atmosphere, to a 500 milliliter, stainless steel, reaction bomb. There is then charged to said bomb 50 milliliters of anhydrous n-octane, 2 millimoles of ethylaluminum dichloride, and 6 millimoles of triphenylstannane. The bomb is then sealed, heated to 80° C., and agitated for 2 hours. Next, said bomb is pressurized to 600 p.s.i.g. with ethylene and is thereafter maintained at 600 p.s.i.g. for about 8 hours by the periodic introduction of additional ethylene. The reaction products are analyzed and it is found that about 135 grams of polyethylene has been produced.

When, under the same conditions, a catalyst is prepared precisely as set forth above with the exception that no ethylaluminum dichloride is added, the resulting polymerization yields only about 30 grams of polyethylene.

The polymers produced by the catalysts of the present invention can be subjected to such aftertreatment as may be desired to fit them for particular uses or to impart desired properties. Thus, the polymers can be extruded, mechanically milled, filmed or cast, or converted to sponges or latices. Also, antitoxidants, stabilizers, fillers such as carbon black and silica, extenders, plasticizers, pigments, insecticides, fungicides, etc., can be incorporated into the polymers.

Obviously, many changes can be made in the above-described examples and procedures without departing from the scope of the invention. For example, pyrogenically coformed metal oxides, or metal oxides coformed with, or mixed with, other compounds are suitable for the purposes of the present invention.

Accordingly, it is intended that the above disclosure be regarded as illustrative in nature and as in no way limiting the scope of the invention.

What I claim is:

1. A process for polymerizing a substance chosen from the group consisting of a mono-olefin, mixtures of mono-olefins, a di-olefin, mixtures of di-olefins and mixtures thereof which comprises contacting said substance at temperatures between about −25° C. and 250° C., with a catalyst comprising
   (a) a substantially nonporous, finely-divided inorganic solid having an average particle diameter of less than about 0.1 micron and carrying in chemical combination between about $5 \times 10^{-4}$ and about $4 \times 10^{-3}$ equivalents per gram of surface structures conforming to the formula $$TO_zQ_s$$

wherein T is a metal chosen from the group consisting of the metals of the Groups IVa, Va and VIa; O is oxygen; z is a number from 0 to 1; each Q is chosen from the group consisting of alkoxy and aryloxy radicals comprising 1 to 8 carbon atoms; s is a number from 1 to 5; and wherein said structures are chemically linked directly from T to at least one oxygen atom in the surface of said solid;
   (b) an organometallic reducing compound chosen from the group of compounds conforming to the formulae $$MM'_vX_nR_{y-n}$$

wherein M is a metal of Groups I, II and III of the peridoic table; M' is a metal of Group I; v is a number from 0 to 1; each X is any halogen; n is a number from 0 to 3; each R is chosen from the group consisting of any monovalent hydrocarbon radical and hydrogen; y is a number from 1 to 4; and wherein y−n equals at least one, and $$R'_pH_mSO_{\frac{4-(m+p)}{2}}$$

wherein each R' is chosen from the group consisting of any monovalent hydrocarbon radical, alkoxy radical, aryloxy radical, and the halogens; p is a number from 0 to 3; each H is a hydride radical; m is a number from 1 to 4; S is a metal of Group IVb; and O is oxygen; and
   (c) a Lewis acid chosen from the group consisting of metal halides, organometallic halides and boron halides, said Lewis acid being present in amounts between about the minimum amount that will increase yield and up to about 20 millimoles of said Lewis acid per milliatom of said T.

2. The process of claim 1 wherein the substance to be polymerized is an α-mono-olefin.

3. The process of claim 1 wherein the substance to be polymerized is a di-olefin which has a double bond in the alpha position.

4. The process of claim 1 wherein said organometallic reducing compound is an aluminum alkyl.

5. The process of claim 1 wherein said organometallic reducing compound is a trialkylsilane.

6. The process of claim 1 wherein said inorganic solid has an average particle diameter of less than about 50 millimicrons.

7. The process of claim 1 wherein between about 0.1 and about 10 millimoles of said Lewis acid is present per milliatom of titanium.

8. The process of claim 1 wherein said Lewis acid is a boron halide.

9. The process of claim 1 wherein said Lewis acid is boron trifluoride.

10. The process of claim 1 wherein said Lewis acid is a metal halide.

11. The process of claim 1 wherein said Lewis acid is aluminum trichloride.

12. A catalyst comprising
    (a) a nonporous finely-divided inorganic solid having an average particle diameter of less than about 0.1 micron and carrying in chemical combination between about $5 \times 10^{-4}$ and about $4 \times 10^{-3}$ equivalents per gram of surface structures conforming to the formula $$TO_zQ_s$$

wherein T is a metal chosen from the group consisting of the metals of Groups IVa, Va and VIa; O is oxygen; z is a number from 0 to 1; each Q is chosen from the group consisting of alkoxy and aryloxy radicals comprising 1 to 8 carbon atoms; s is a number from 1 to 5; and wherein said structures are chemically linked from T to at least one oxygen atom in the surface of said solid and
    (b) an organometallic reducing compound chosen from the group conforming to the formulae $$MM'_vX_nR_{y-n}$$

wherein M is a metal of Groups I, II and III of the periodic table; M' is a metal of Group I; v is a number from 0 to 1; each X is any halogen; n is a number from 0 to 3; each R is chosen from the group consisting of any monovalent hydrocarbon radical and hydrogen; y is a number from 1 to 4; and wherein y−n equals at least one, and $$R'_pH_mSO_{\frac{4-(m+p)}{2}}$$

wherein each R' is chosen from the group consisting of any monovalent hydrocarbon radical, alkoxy radical, aryloxy radical and the halogens; p is a number from 1 to 4; each H is a hydride radical; m is a number from 1 to 4; S is a metal of Group IVb; and O is oxygen; and
    (c) a Lewis acid chosen from the group consisting of metal halides, organometallic halides and boron halides, said Lewis acid being present in amounts between about the minimum amount that will increase yield and about 20 millimoles of said Lewis acid per milliatom of T.

13. The catalyst of claim 12 wherein the finely-divided inorganic solid is chosen from the group consisting of pyrogenic silica and alumina.

14. The catalyst of claim 12 wherein T is a metal of Group IVa.

15. The catalyst of claim 12 wherein T is titanium.

16. The catalyst of claim 12 wherein T is zirconium.

17. The catalyst of claim 12 wherein T is a metal of Group Va.

18. The catalyst of claim 12 wherein T is vanadium.

19. The catalyst of claim 12 wherein T is a metal of Group VIa.

20. The catalyst of claim 12 wherein each Q is an alkoxy radical.

UNITED STATES PATENTS

References Cited by the Examiner

| | | | |
|---|---|---|---|
| 3,166,542 | 1/1965 | Orzechowski | 260—99.9 |
| 3,166,543 | 1/1965 | Orzechowski | 260—99.9 |

JOSEPH L. SCHOFER, *Primary Examiner.*

L. EDELMAN, *Assistant Examiner.*